April 1, 1958            T. LOEW            2,828,796
METHOD OF MAKING POINTED END FABRIC FACED BELTS
Original Filed June 26, 1950            4 Sheets-Sheet 4
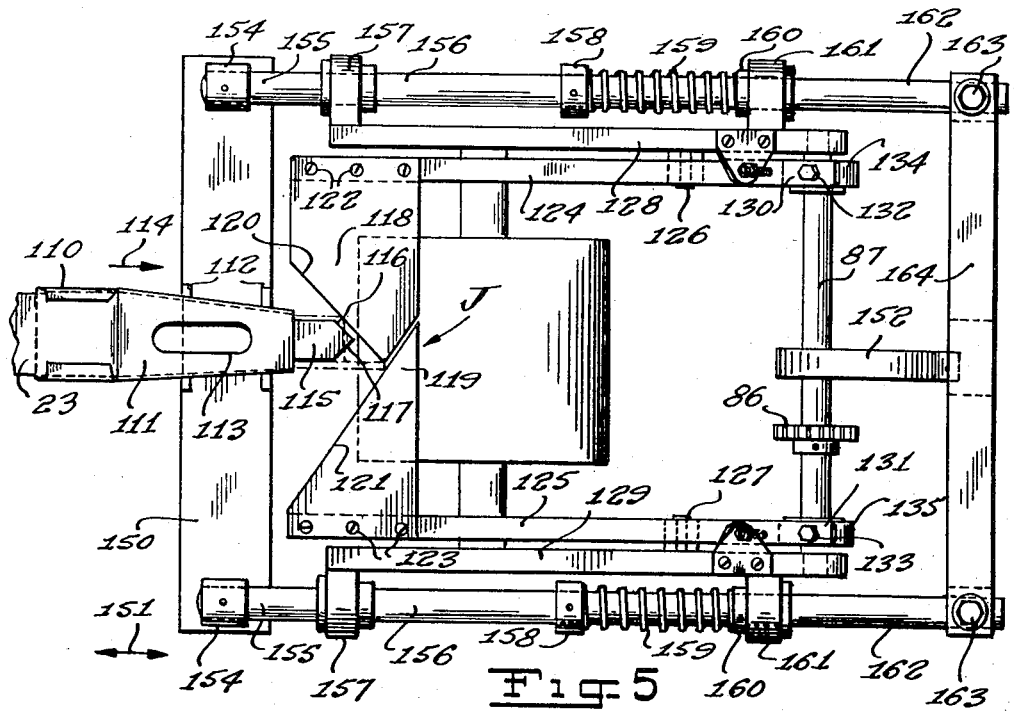
INVENTOR
THEODORE LOEW
BY
ATTORNEY

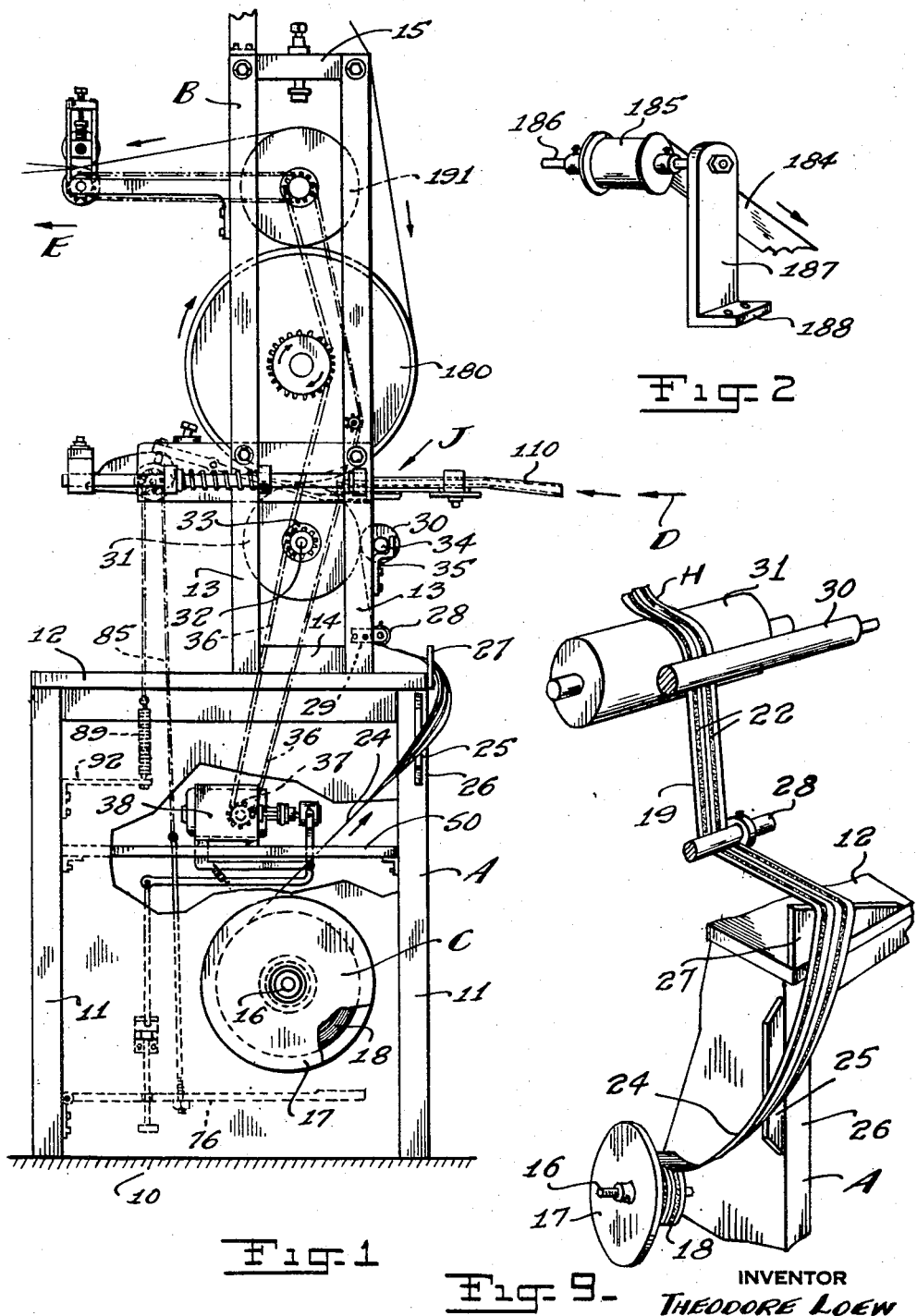

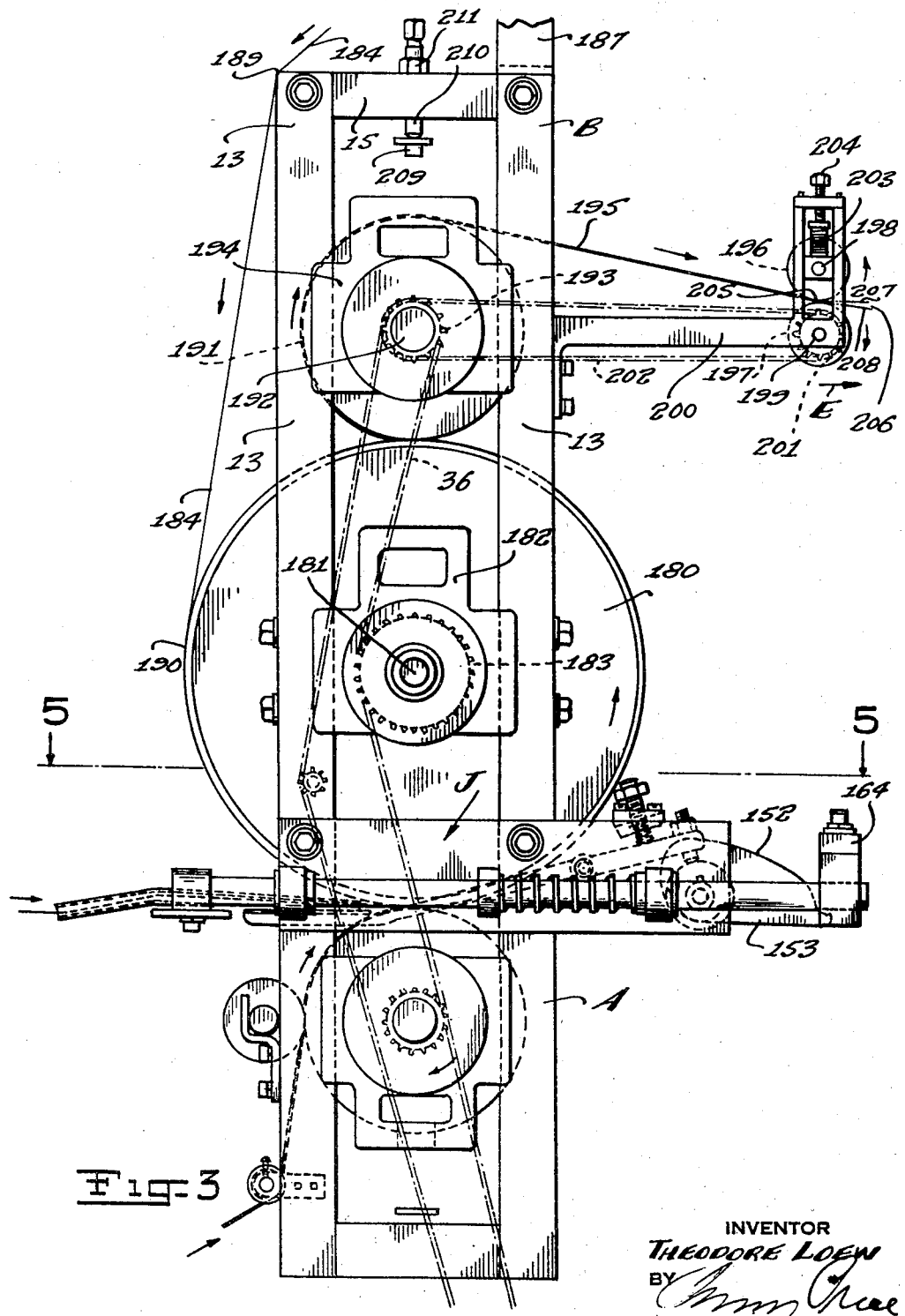

United States Patent Office 2,828,796
Patented Apr. 1, 1958

2,828,796

METHOD OF MAKING POINTED END FABRIC FACED BELTS

Theodore Loew, Stamford, Conn., assignor to Cee Bee Manufacturing Co. Inc., a corporation of New York Original application June 26, 1950, Serial No. 170,350, now Patent No. 2,685,908, dated August 10, 1954. Divided and this application August 10, 1954, Serial No. 448,972

2 Claims. (Cl. 154—4)

The present invention relates to a belt making and procedure for making fabric belts.

In the making of fabric belts to be attached to plastic backings, considerable difficulty has been experienced in cutting and shaping the fabric material to the plastic sheet material forming the backing, and also in obtaining proper attachment and connection therebetween.

Usually an excessive amount of manual labor is required with many operations and uniformity is usually not obtained and there is a higher rejection rate due to imperfections and excessive variation in size and quality.

It is among the objects of the present invention to provide a novel system of belt making involving a procedure in which the belts will be made at a relatively high rate with a minimum of manual intervention and a high degree of uniformity.

Another object is to provide a novel belt making system in which fabric belts with plastic backings are produced at a high rate with uniform size, dimensions and quality without substantial manual intervention and with a minimum of rejects.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory first to form the plastic backing of a folded strip of fabric carrying a facing over the whole area or in localized stripes or spots of thermoplastic material. This thermoplastic backing strip is preferably fed continuously to the assembly unit where it is assembled with the fabric facing.

The fabric facing is fed intermittently in sections to be assembled with the plastic backing.

Desirably the fabric facing is first folded so that the sides thereof will be folded below the fabric face and such folded under portion then will be mounted upon the top of the plastic backing.

Desirably, after folding of the fabric facing strip, the forward corners thereof are folded under to form a point and then the folded and pointed strip is passed over and under hot rollers to complete the union of the fabric facing to the plastic backing strip.

In forming the point, as the folded fabric facing strip is advanced, first one corner is moved downwardly and then under the fabric strip and then the other corner is moved downwardly and under the fabric strip and then the completely folded, pointed fabric strip is pressed down upon the plastic backing under substantial pressure.

If desired, the fabric facing may be fed intermittently manually or by automatic mechanism from a continuous strip of fabric material. After the adhesion has been completed between the fabric facing and the plastic backing, the strip may be cut into sections and then stitched together to form the final belt material.

A particularly important feature of the present invention resides in the assembly mechanism, according to which reciprocating blades are moved vertically against the forward corners of a folded fabric belt facing, so that the corner is first moved downwardly and then folded under as the belt action is moved forwardly just prior to assembly with the fabric backing.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Fig. 1 is a side elevational view of one form of belt assembling machine according to the present invention in which the cloth is fed in from the right and the plastic backing is fed upwardly from below.

Fig. 2 is a fragmentary perspective view of a paper feed which may be mounted upon the top of the machine of Fig. 1.

Fig. 3 is a side sectional view of the upper portion of the structure shown in Fig. 1 upon an enlarged scale as shown in Fig. 1.

Fig. 5 is a top horizontal sectional view taken upon the line 5—5 of Fig. 3.

Fig. 6 is a top plan view showing the end of the belt partly formed.

Fig. 7 is a top plan view similar to Fig. 6, showing the belt after the next operation.

Fig. 8 is a top plan view of Figs. 6 and 7, showing the top formed portion of the belt lifted from the fabric backing sheet.

Fig. 9 is a side perspective view showing the manner in which the belt backing is fed upwardly to the assembly arrangement.

Figure 4:
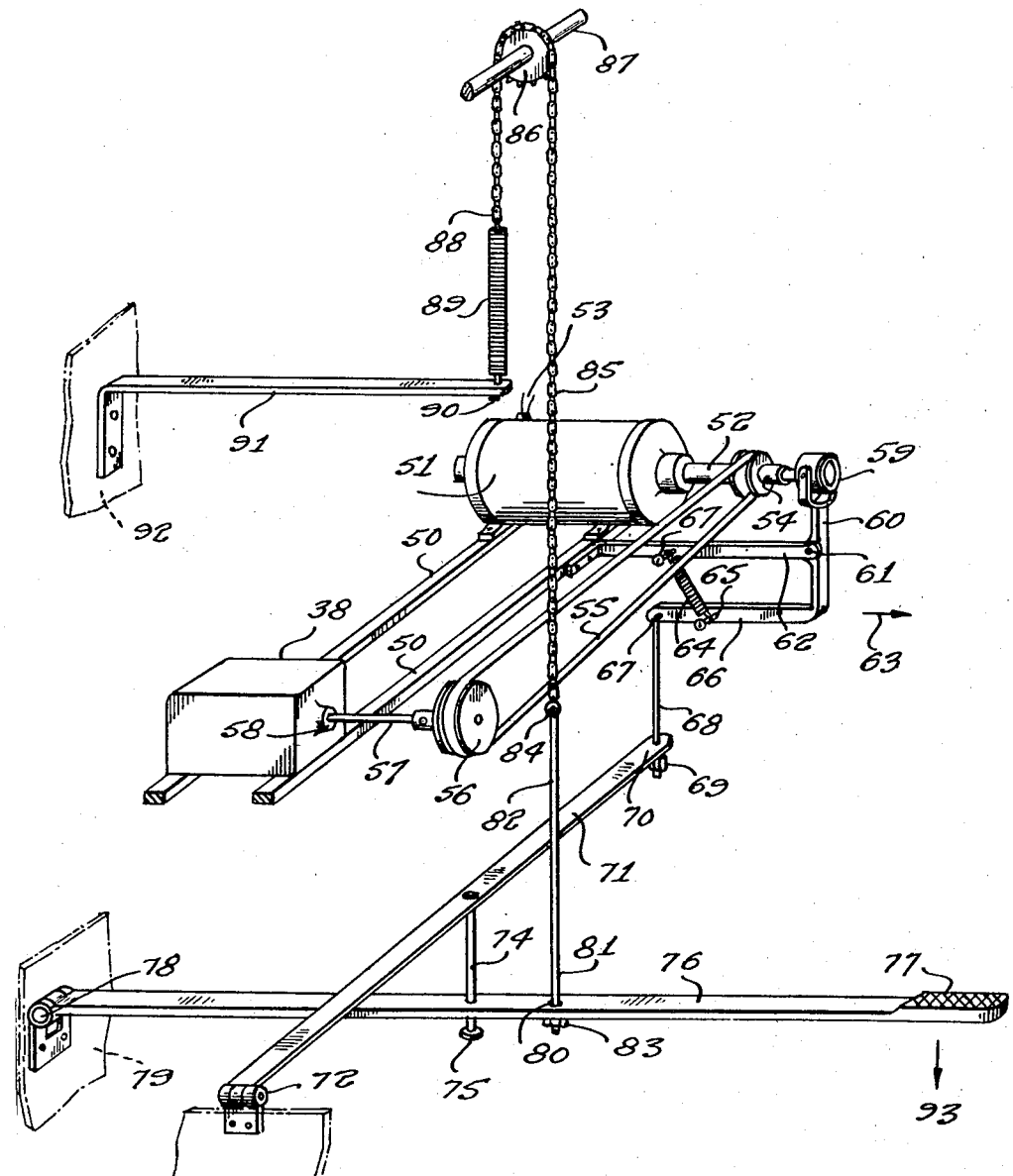
Fig. 4 is a diagrammatic perspective view showing the manner of operating the mechanism of Figs. 1 and 2.

Referring to Figs. 1 and 2, the mechanism has a base A with a top frame B. As shown in Fig. 1, there is a supply of the plastic backing material with a feed of cloth or facing material, as indicated at D, from a supply not shown.

The finished belting material is removed as indicated in the direction E, as shown in Figs. 1 and 2.

The assembled belting material is indicated in three stages at F, G and H in Figs. 6, 7 and 8.

The present invention is particularly directed to the folding and assembling arrangement indicated at J, in large scale in Fig. 5 and in smaller scale in Figs. 1 and 2.

Referring to Figs. 1 and 2, the frame A has the side members 11 resting upon the floor 10. The side leg members 11 support the table 12. Upon the table 12 is supported the upper frame B having the side vertical members 13 and the bottom cross member 14 and the top cross member 15.

The bottom frame A supports the shaft 16 which carries the spool 17 carrying the plastic backing, which may consist of woven cloth impregnated with a thermoplastic, resinous material. As shown in Fig. 8, this material may consist of a back portion folded in, as indicated at 20, to form a double-ply fabric, the edges of which meet at 21.

Upon each face of the folded-in plies is the strip 22 of fusible, adhesive material which will enable attachment of the fabric 23 forming the face of the belt. As shown, the plastic backing material moves upwardly, as indicated at 24, and through the opening 25 in the guide 26 mounted on the leg 11. The plastic material then moves through the guide member 27 to the guide roller 28 supported upon the bracket 29 by the vertical frame member 13. It then moves upwardly between the rollers 30 and 31.

The roller 31 is an internally heated roller and is mounted upon the shaft 32, carrying the gear wheel 33. The roller 31 may be internally heated by gas or electricity.

Contacting the roller 31 is the roller 30, the shaft 34 of which rests in a bracket 35. The pinion or sprocket 33 is driven by the continuous mesh or sprocket chain 36 which is driven from the lower sprocket 37 driven by the gear chain box 38.

As shown best in Fig. 4, the gear chain box 38 is supported upon the rails 50, which are in turn supported upon the side leg members 11 of the lower frame A.

The gear chain box 38 is driven from the motor 51, also supported upon said rails 50, having the shaft 52 and supplied by an electrical source 53. The shaft 52 carries the pulley 54 having the belt 55. The pulley 56 drives the shaft 57 extending into the gear chain box 38.

The clutch 59 is mounted upon an arm 60. The arm 60 is pivotally mounted at 61 on the frame arm 62.

The clutch arm 60 is normally biased in the direction 63 by the coil spring 64. The coil spring 64 extends between the attachment 65 on the arm 66 and the attachment 67 on the bracket arm 62.

The end 67 of the arm 66 is connected by the link or rod 68, which is adjustable in length, as indicated at 69. This link extends to the end 70 of the throw-in clutch arm 71, which is pivotally mounted at 72 upon the side panels 73.

The arm 71 is connected by the rod 74 and the nut 75 to the reciprocating foot lever 76. The lever 76 has a foot contacting portion 77.

The other end of the arm or lever 76 has a pivotal mount 78 to the back panel portion 79. The lever 76 has an opening 80 receiving the lower end 81 of the rod 82. An adjustment is provided by the nut 83. The upper end of the rod 82 has a connection 84 to the link chain 85. The upper end of the mesh or sprocket chain 85 passes over the sprocket wheel 86 on the shaft 87.

The end 88 of the mesh or sprocket chain 85 is connected to the coil spring 89. The coil spring 89 at its end 90 is connected to the bar 91, which is mounted upon the wall 92.

In operation, when the treadle 77 is pressed downwardly, as indicated by the arrow 93, the clutch is engaged and the motor shaft 52 is caused to drive the gear box 38 through the belt 55 and the pulleys 54 and 56. At the same time the sprocket chain 85 will rotate the sprocket wheel 86. This will cause the sprocket wheel 37 (see Fig. 1) to drive the hot roller 31 through the sprocket wheel 33, and the plastic backing will pass to the assembly device J between the hot roller 31 and the idler roller 30.

The cloth material 23 is fed in through the folding device 110, which receives the fabric 23 and guides it into the converging or funnel portion 111, causing the edges to fold inwardly and over each other, as indicated at 112a in Fig. 8.

The funnel 111 is supported, as indicated, by the bars 112 (see Fig. 5) and is provided with the slot 113 for observation of the fabric being folded and advanced in the direction 114 (see Fig. 5).

The folded fabric will then pass out over the tongue 115 having folding edges 116 and 117.

The folding blades 118 and 119 will be positioned above the fabric being advanced across the extension plate or nose or tongue 115.

The folding blades 118 and 119 have the oblique forward edges 120 and 121 and they are mounted, as indicated, by the screws 122 and 123 upon the arms 124 and 125. The arms 124 and 125 are mounted upon the shafts 126 and 127 upon the side frame members 128 and 129.

The ends of the arms 124 and 125 carry the head members 130 and 131 having the adjustable followers 132 and 133 which ride on the cams 134 and 135. The cams 134 and 135 ride on the main cam shaft 87, which also carries the sprocket wheel 86.

The funnel member 111 supported by the legs 112 upon the cross frame member 150 is reciprocated as indicated by the double-headed arrow 151 by the cam 152 on the cam shaft 87, which cam, as shown best in Fig. 3, has a long lobe 153.

The bracket member 150 has the collars 154 mounted thereon, which receive the ends 155 of the reciprocatory shafts 156. The shafts 156 slide in the collars 157, which are mounted upon the side frame members 128 and 129.

On the shafts 156 are the spring retainer collars 158 which press upon the coil springs 159. The other ends of the coil springs 159 will react against the collars 160, which are mounted by the members 161 from the side frame members 128 and 129.

The ends 162 of the reciprocatory shafts 156 have the adjustable set-screw connections 163 to the members 164 which permit the cross bar 164 to be moved forwardly and backwardly in respect to the cam 152.

In operation, the fabric is fed into the holder device 110 and projects past the tongue 115, but so that it projects past the oblique folding edges 116 and 117 of the tongue 115. Then the treadle 77 is pressed down, causing the gear box 38 to drive the sprocket chain 36 through the sprocket wheel 37.

At the same time the lowering of the treadle 76 through the sprocket chain 85 will drive the sprocket wheel 86 and the cam shaft 87. This movement of the cam shaft 87 will first result in the lowering of the blade 118 from above to below the tongue 115, causing the projecting corner 165 of the folded fabric to be folded at the upper righthand corner of Fig. 6.

In the meanwhile the cam 152, acting upon the bar 164, will advance the tongue 115 carrying the fabric 23 up to and past the edge 120 of the blade 118, which will cause the corner 165 to be folded under as shown at 165 in Fig. 6 and also as indicated at 165 in Fig. 8.

As this occurs, the edge 117 of the tongue 115 will approach the edge 121 of the folding blade 119 and just before it reaches the edge 121 the blade 119 will pass below the tongue 115, folding down the other corner 166 of the fabric, as indicated in Figs. 7 and 8.

The folded corner then, as indicated at 167, will be advanced to the hot roller 31, where it will be placed on top of the plastic strip 24, which will be made adhesive by the heat of the roller 31.

The continuous plastic strip 19 with the assembled, folded fabric strip 23 will then pass over the electrically heated roller 180, which is mounted upon the shaft 181. The shaft 181 bears in the slidable bearing member 182 between the vertical members 13 of the upper frame B.

The shaft 181 carries the sprocket 183 which is driven by the sprocket chain 36.

Upon the heated roller 180, as it receives the assembled, folded fabric 23 and plastic backing 19, is the paper strip 184. The paper backing strip 184 is normally reeled from the paper reel 185 on the shaft 186 at the top of the frame B.

On the top of the paper frame B will be an upstanding bracket 187 having the mounting lug 188.

The paper passes downwardly, as shown in Fig. 3, across the guide corner 189 onto the roller 180, as indicated at 190.

The roller 180 will pass the paper backing 184, the heated thermoplastic strip 19 and the folded fabric 23 onto the heated roller 191.

The heated roller 191 has the shaft 192 which carries the sprocket 193 driven by the sprocket chain 36. The shaft 192 has bearing mounts in the block 194 which are adjustable in the side frame members 13.

The heated strip with the paper backing, as indicated at 195, will then pass between the pressure rollers 196 and 197.

The pressure rollers have the shafts 198 and 199 which are fitted into the shaft 199 and are mounted in the arm 200 and has a sprocket 201 which is driven by the sprocket chain 202 through the shaft 192.

The upper pressure roller 196 has the shaft 198 which is pressed down by the coil spring 203 and the adjusting screw 204, so that there will be a tight contact at 205 where the thermoplastic folded strip 19 contacts the folded cloth strip 23 and assures that the adhesive material 22 in its softened, adhesive condition will be pressed firmly against the folded portions 112 of the fabric strip 23.

By a stripper arrangement, not shown, at 206 the paper may be removed, as indicated at 207, and the assembled fabric and plastic backing may be removed as indicated at 208.

The adjustment, as indicated at 209, 210 and 211, upon the top cross member 15 will enable regulation of the pressure between the rollers 180, 191 and 31, all of which rollers are electrically or gas heated.

Normally, the adhesive backing or thermoplastic strip 18 will be fed continuously while the cloth strip 23 will be fed intermittently through the funnel or folder member 111.

The corners 165 and 166 will be folded inwardly in succession by the blades 118 and 119 under action of the arms 124 and 125 as the folder device 111 is moved forwardly by the cam 152 acting upon the cross bar 164.

To describe the folding operation in greater detail, the corner 165 in Fig. 6 after being folded inwardly and under obliquely along the fold line or fold edge 116 will have its edge 116a beyond the longitudinal axis of the belt which is positioned between the inside edges indicated by the dotted line 112a. These inside edges 112a indicate the position of the side edges of the fabric after it is folded inwardly by the folding device 110.

The other edge of the corner 116b, as shown in Fig. 6, will extend transversely across the axis and across the edges 112a.

The second corner 166, which is folded after the first corner 165, will then be folded so that its edge also extends beyond the axis between the edges 112a and its edge will lie in the position as indicated at 117a in Fig. 17. The two corners will then overlap at 117b in Figs. 7 and 8 across the longitudinal axis and the folded corner 167 will be finished without raw edges or threads projecting, as would occur if the corners were only folded up to the longitudinal axis without being folded beyond the longitudinal axis.

This sequential folding operation will produce uniformity in the corners.

It will be noted that the folding edge 120 of the folder 118 acts first and it has completed its action before the edge 121 of the folder 119 acts at the remaining corner, as indicated in Figs. 6 and 7.

When the two corners 165—166 are made to overlap at 117b across the longitudinal axis, although there is an extra thickness present when the folds are made, the bulge is eliminated to a great extent when the folded down portions are pressed against and made to adhere to the backing layer.

When the folding is completed, as indicated in Fig. 7, the folded strip will then be placed upon the adhesive backing 18 and pass over the heated rollers 180 and 191, with the assurance that there will be a permanent attachment between the fabric face and the plastic backing by the time the bight rollers 196 and 197 apply the final pressure.

After the finished material is reeled, as indicated, from the position 208, the plastic material may be cut in strips and the fabric strip 23 may be stitched to the plastic backing 18.

Although the belting back material has been described as plastic material, it is also possible to utilize other backing material which may or may not be laminated.

While there has been herein described a preferred form of the invention, it should be understood that the same may be altered in details and in relative arrangement of parts within the scope of the appended claims.

The present application is a division of application Ser. No. 170,350 filed June 26, 1950, now Patent No. 2,685,908 granted August 10, 1954.

Having now particularly described and ascertained the nature of the invention, and in what manner the same is to be performed, what is claimed is:

1. A method of making a pointed-end fabric-faced belt having a longitudinal axis from a fabric strip and a backing strip with the fabric strip initially being wider than the backing strip and having its side edges folded inwardly and under the fabric strip on the side facing of the backing strip so that the side folded fabric strip will be of the same width as the backing strip and then folding in sequence the forward corners of the side folded fabric strip inwardly, said folding being done along fold lines oblique to the longitudinal axis of the belt, so that the inside edges of the obliquely inwardly folded corners will extend over and beyond the longitudinal axis of the belt with the side edges of the folded corners being on the opposite side of the longitudinal axis and overlapping along the longitudinal axis.

2. A method of making a pointed-end fabric-faced belt having a central longitudinal axis which comprises providing elongated fabric and backing strips, said elongated fabric at the end which is to be pointed having right angle corners, and folding in said corners along oblique fold lines in sequence so that the inwardly folded portions will extend beyond the central longitudinal axis and overlap at the central longitudinal axis.

References Cited in the file of this patent

UNITED STATES PATENTS

| | | |
|---|---|---|
| 2,266,953 | Blue | Dec. 23, 1941 |
| 2,478,604 | Sveda | Aug. 9, 1949 |
| 2,502,462 | Kaupke | Apr. 4, 1950 |
| 2,625,690 | Hickok | Jan. 20, 1953 |
| 2,635,670 | Winberg | Apr. 21, 1953 |
| 2,666,926 | Isaacs | Jan. 26, 1954 |
| 2,685,908 | Loew | Aug. 10, 1954 |